Sept. 17, 1940.   R. G. BOWER   2,214,897
CALCULATING MACHINE
Filed April 26, 1937   3 Sheets-Sheet 1

INVENTOR
Raymond G. Bower
BY
Davis Lindsey Smith & Shmts
ATTORNEYS

Sept. 17, 1940.　　　R. G. BOWER　　　2,214,897

CALCULATING MACHINE

Filed April 26, 1937　　　3 Sheets-Sheet 2

INVENTOR
Raymond G. Bower
BY
ATTORNEYS

Sept. 17, 1940.    R. G. BOWER    2,214,897
CALCULATING MACHINE
Filed April 26, 1937    3 Sheets-Sheet 3

INVENTOR
Raymond G. Bower
BY
ATTORNEYS

Patented Sept. 17, 1940

2,214,897

UNITED STATES PATENT OFFICE 2,214,897

CALCULATING MACHINE

Raymond G. Bower, Bloomfield Hills, Mich., assignor to Burroughs Adding Machine Corporation, Detroit, Mich., a corporation of Michigan Application April 26, 1937, Serial No. 138,875

3 Claims. (Cl. 235—60)

This invention relates to a calculating machine and it is concerned principally with an improved construction for automatically controlling the conditioning of the machine for various functions.

Different functions of calculating machines have heretofore been controlled automatically by the paper carriage by causing said carriage to actuate certain devices that condition the machine for different functions. The actuation of these devices by the carriage places a load on it that often interferes with its proper operation. One of the difficulties is that the load varies between different columns because there may be a different number of controls for the respective columns. If the carriage spring is made strong enough to move the carriage rapidly with a maximum load, the carriage action is too rapid for a smaller load and, vice versa, if the spring is made weak, the movement of the carriage will be too slow and sluggish when the load is large. In practice, the load on the carriage limits its speed of operation. The persent invention has been devised to relieve the carriage of this load and yet enable the machine to be automatically conditioned for different functions in accordance with the columnar position of the carriage. The form that the invention takes is such that it may be readily applied to existing machines without requiring any substantial reconstruction.

The general object of the invention is to provide an improved automatic controlling means for the functions of a calculating machine.

A more particular object is to provide improved automatic controls that relieve the paper carriage of the load of actuating the function control means.

Other and more specific objects will appear from the following specification and drawings.

An embodiment of the invention is shown in the accompanying drawings in which.

Figure 1:
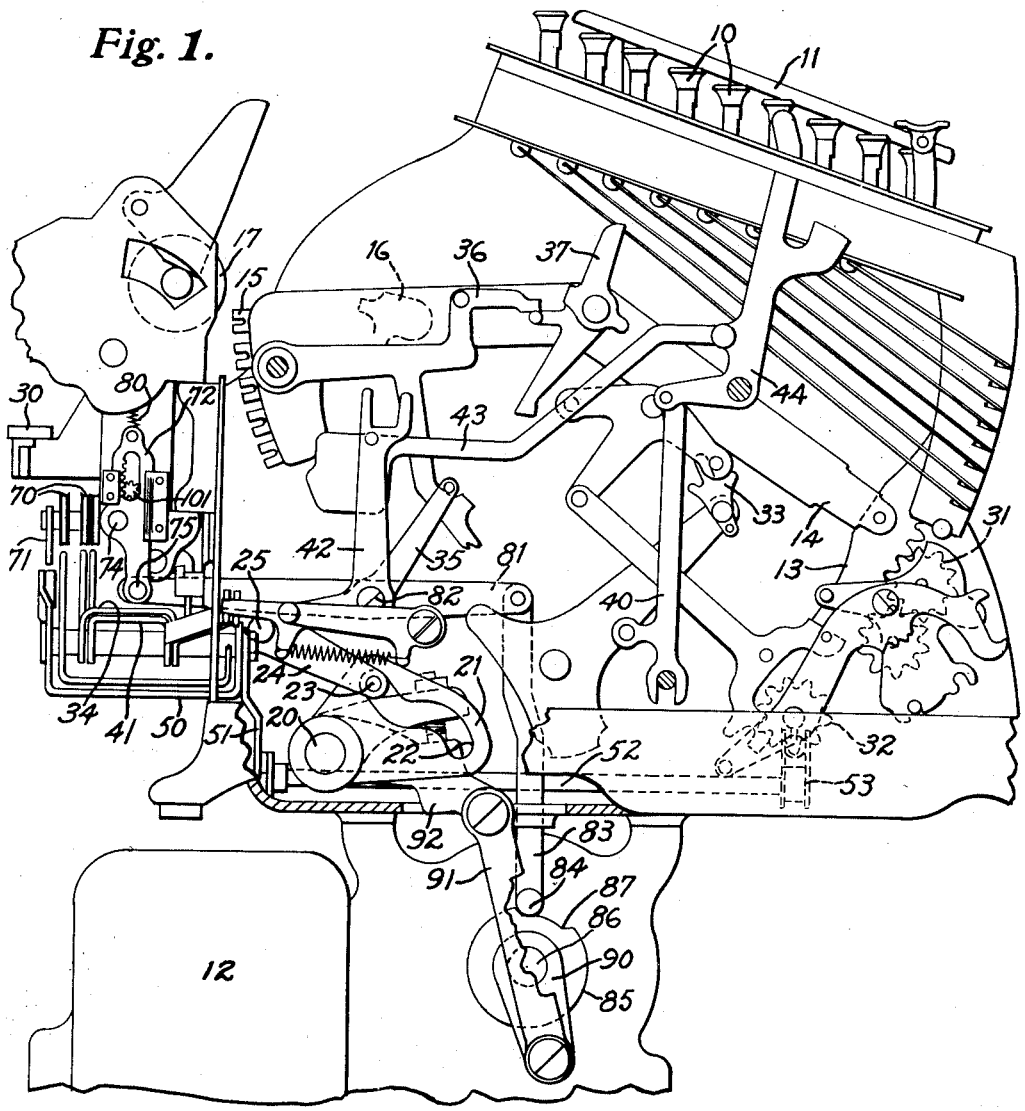
Figure 1 is a left-side elevation of the machine showing some of the function controls for conditioning the machine for different functions.

The invention is shown applied to a Burroughs high keyboard machine whose construction is well known and described in numerous prior patents. Only such parts as are particularly concerned with the present invention will be described, and these, only briefly.

General machine features

The machine has a plurality of banks of amount keys 10 that are depressed to index an item in the machine. After the item has been indexed, the machine is given a cycle of operation, which is usually done by depressing a motor bar 11 that causes a motor 12 to automatically cycle the necessary parts to cause the machine to function. During the cycle, actuators 13 descend to differential positions under the control of the indexed keys. Connected to the actuator racks are arms 14 whose rear ends carry type 15 that are differentially positioned with the actuators. After the type have been positioned, a printing mechanism including the hammer 16 is operated to print the amount on paper held about the platen 17.

The machine is arranged to cause printing to occur in different columns on the paper, and this is accomplished by having the paper carriage moved from one column to another, such movement normally being an incident to each cycle of operation of the machine. For this purpose, a tabulating mechanism is provided for the carriage, said mechanism being normally operated during each cycle but being capable of being disabled, if desired. The machine has a shaft 20, usually called the "100" shaft, to which a cam 21 is fixed. This cam has an irregular slot 22 in it in which travels a roller stud 23 on the end of a lever 24 pivoted at 25. The other end of this lever has a forked end engaging a stud 26 on a slide plate 27 that rocks a shaft 28 to rock the tab stops 29 to enable the paper carriage to move from one column to another. The tabulating mechanism is described in Rinsche Patent No. 1,580,534. The carriage normally tabulates from column to column across the machine in one direction which may be called the "tabulating direction," as an incident to each machine cycle. It may be automatically returned by a carriage return mechanism 30 described in detail in said Rinsche patent.

An add-subtract registering mechanism 31 is provided, the same being of the "tumbling register" form. The machine is also provided with a plurality of multiple registers 32 of the type described in Pasinski patent, No. 1,911,768.

The machine is normally conditioned for addition but it may be conditioned for other functions such as printing an item without registering it (non-add); subtraction; control of the tabulating mechanism to get special movements of the carriage; control of the carriage return mechanism; or selection of one or more registers.

The add-subtract register 31 may be non-added by disabling the pass-by pawl 33 as described in Patent No. 1,911,768. When controlled automatically it is controlled by the yoke 34 acting through the parts 35, 36 and 37, which may be called function control devices.

The machine may be conditioned for subtraction in the add-subtract register by raising the link 40 as described in Patent No. 1,911,768. When controlled automatically the link is raised by movement of a yoke 41 acting through the parts 42, 43 and 44 which are the function control devices for subtraction.

The selection of the multiple registers 32 is controlled by a yoke 50 acting through parts 51, 52 and 53, as described in Pasinski Patent No. 1,911,768.

While other function controls may be provided, such as hammer block control of the printing mechanism, control of line-spacing, control of the opening of the front-feed throat, etc., it has not been considered necessary to illustrate all the controls because the present invention is concerned more particularly with the indexing and setting of machine controlling device irrespective of exactly what functions may be controlled thereby.

*Power operated conditioning of the machine*

A function indexing or determining means is provided which is indexed in accordance with the column in which printing occurs. In the embodiment of the invention shown, this determining means takes the form of rollers 70 supported on the paper carriage. Such rollers are sometimes called carriage cams, tappets, or skids. The determining means for the selection of registers is shown as a stepped cam bar 71 (Fig. 3).

The rollers 70 and the cam bar 71 are carried by a movable frame comprising two side pieces 72 and 73 (Fig. 3) joined by cross bars 74 and 75. The cross bar 74 carries blocks 76 supporting the rollers 70, the blocks being adjustable on the bar. Certain of the blocks also support the cam bar 71. Both the rollers and the cam bar are normally free of any of the function control yokes, so that the paper carriage is free to move from one column to another and to be automatically returned across the machine without any interference through engagement with function control means. The blocks and roller place no appreciable load on the carriage and the carriage is not burdened with actuating the function control yokes. The resistance to movement of the carriage is uniform so that its action will be the same between all columns.

Figure 3:
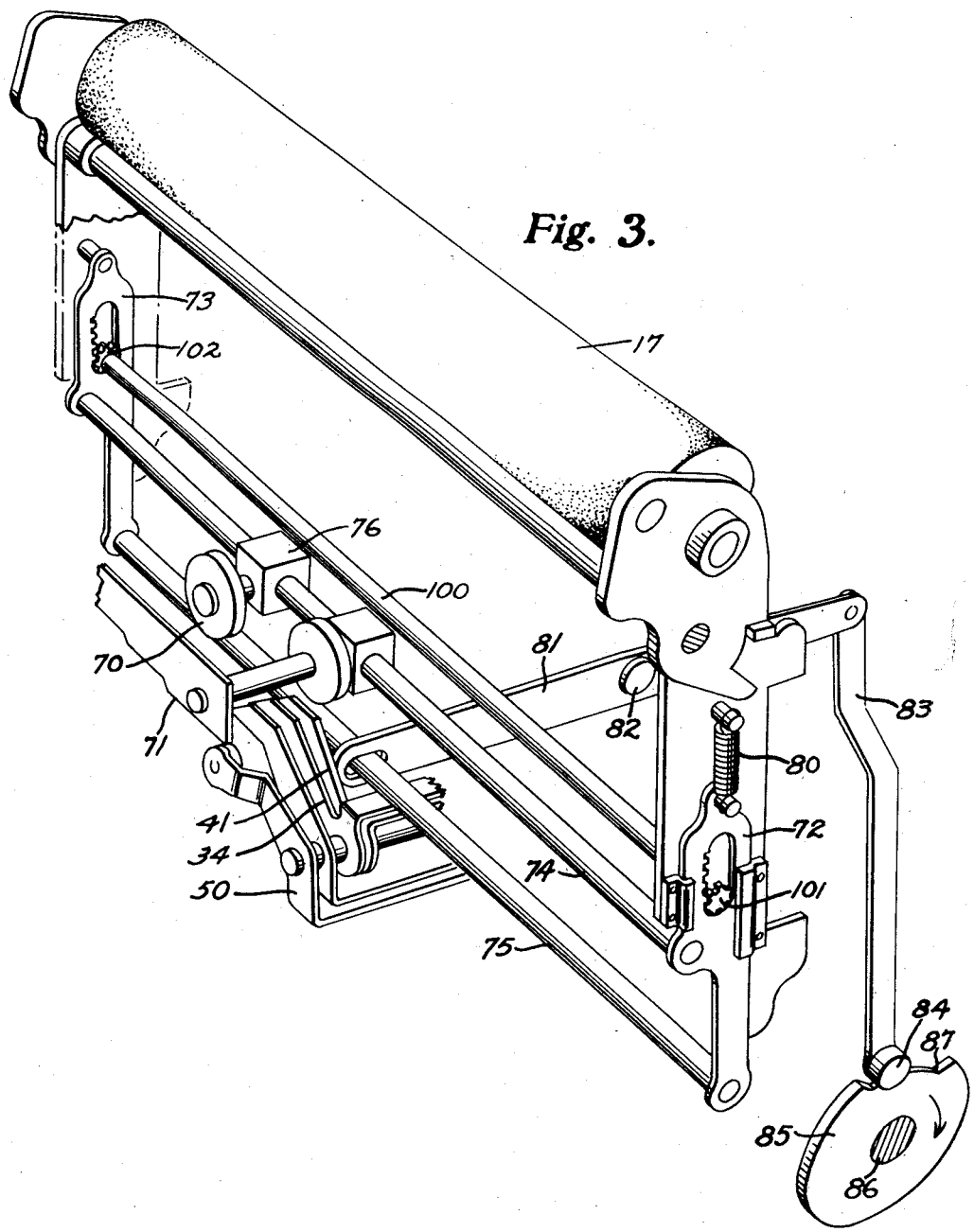
Fig. 3 is a perspective of the invention as it is applied to a skeleton carriage, the parts being in normal inactive position.

The function control means is, as previously explained, actuated by yokes 34, 41 and 50 (Fig. 3) that must be rocked counter-clockwise, as viewed inc Figure 3, to set the function control means to thereby cause the machine to be conditioned for predetermined functions. In the present case, four of these yokes have been shown, the yoke 34 for non-adding the register 31, the yoke 41 for controlling subtraction in said register, and the yoke 50 for selecting the multiple registers 32. The fourth yoke is a spare one that is available for the control of such other functions as may require control from time to time as conditions may require.

Figure 2:
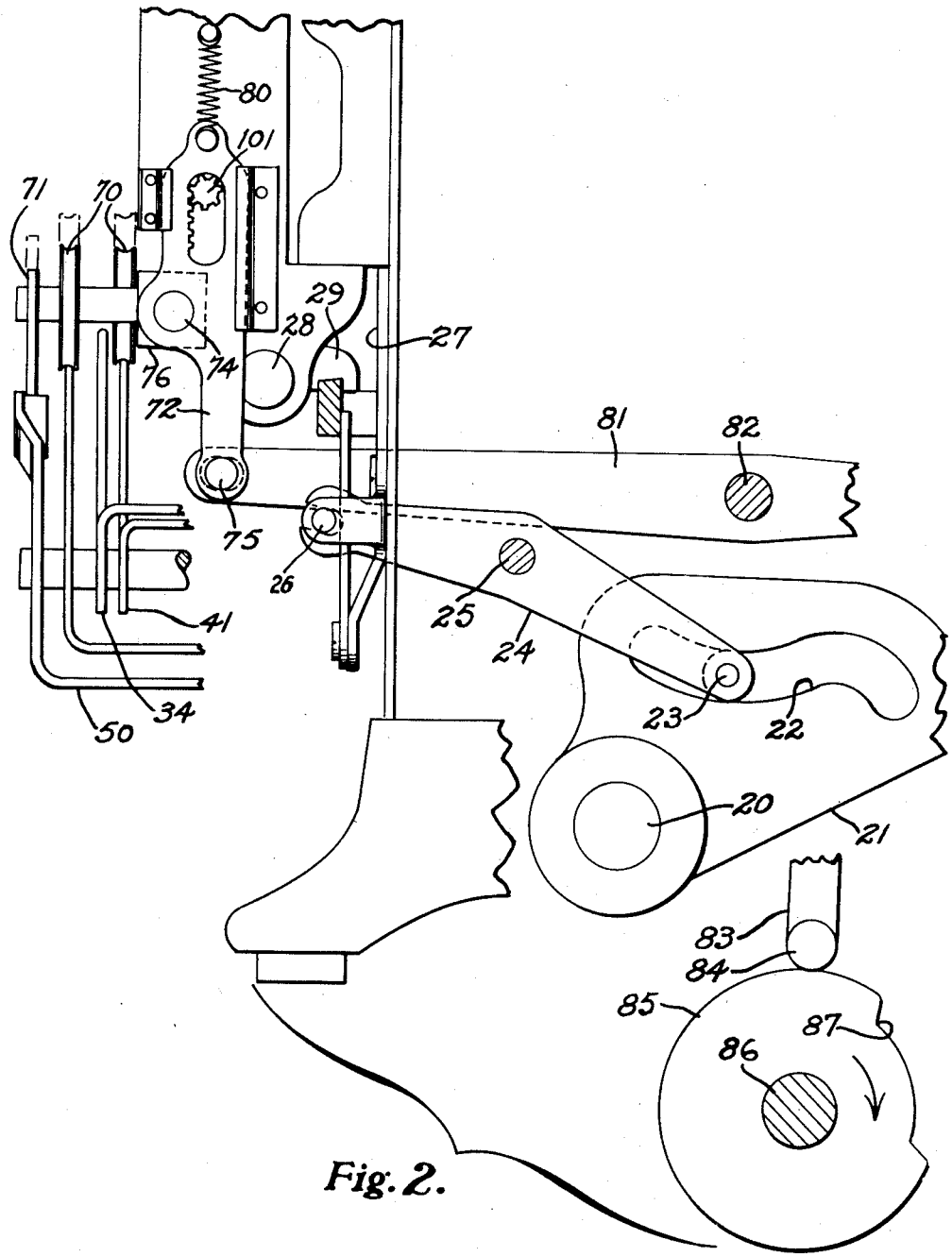
Fig. 2 is a partial left-side elevation of the rear of the machine showing particularly the power-operated portions of the automatic control.

The frame 72—73 is normally held elevated by springs 80 so that the rollers 70 and the cam 71 are out of engagement with the function control yokes. The frame may be moved downward, however, to cause the rollers and the cam bar to engage and move their respective function control devices by means of a lever 81 pivoted at 82 and having a sliding connection with the bar 75. The other arm of this lever is pivoted to a link 83 that has a cam roller 84 on its lower end engaging with the cam edge of a cam 85 fixed to a shaft 86 that is rotated during each cycle of machine operation. Cam 85 has a cut-out portion 87 in which the cam roller 84 normally rests. The shaft 86 carries a crank 90 (Fig. 1) connected by a link 91 to a crank 92 fixed to the shaft 20 that may be called the main shaft of the machine. Shaft 86 and cam 85 are moved through a substantial arc before the shaft 20 is moved appreciably. The arrangement is such that, at the very beginning of a cycle of machine operation, the cam roller 84 is moved upward, which rocks the lever 81 counter-clockwise (Figs. 1, 2, 3) to thereby lower the frame 72—73 to cause the function determining devices, that is, the rollers 70 and the cam 71, to engage the arms of the yokes 34, 41, and 50, to thereby move them to set the function control means. The number of yokes moved depends upon the number of rollers 70 and the shape of the cam bar 71 in each columnar position of the carriage. It will be understood that the carriage is normally moved to a new position near the end of each cycle in order to be in position for the next cycle. The function control devices are held in position until near the end of the cycle when the cut-out portion 87 of cam 85 comes under the roller stud 84 and permits the parts to move back to normal, the frame 72—73 being raised with its springs 80. This occurs prior to the movement of the carriage, so that the carriage will be free to move without any interference because of an engagement between the rollers 70 and cam 71 with the yokes.

In order that the shaft 75, and the side plates 72 and 73 to which it is attached, may not be pulled out of position and jammed by the lever 81 when the force of said lever is exerted on one end of said shaft, as it will be when the carriage is near the end of its travel in either direction, the side plates 72 and 73 are connected by a shaft 100 having spur gears 101 and 102, on its ends which mesh with racks on the respective end plates. This causes the side plates to move in unison without any binding.

The construction above described can be easily applied to existing Burroughs machines by providing a movable frame for the cam rollers 70 and cam bar 71 and by providing the necessary connections for operating the frame. This can be very easily done and, at the same time, an efficient mechanism is provided that enables the function control devices to be conditioned by power, thereby relieving the carriage of the load of actuating them and thereby leaving the carriage free to be moved rapidly between columns without any load being placed upon it as far as the conditioning of the machine is concerned.

The present application concerns a species of a broader invention which is disclosed and claimed in copending application Serial No. 50,133, filed November 16, 1935.

The construction shown is for the purpose of illustration only and variations may be made in it without departing from the spirit and scope of the invention as defined by the appended claims.

I claim:

1. In a machine of the class described having a general operating means for giving it cycles of operation, a traveling paper carriage normally moved from one column to another as an incident to each machine cycle, and function control members, selectively movable to condition said machine for predetermined functions; the combination of means constructed and arranged to be movably mounted on said carriage so as to be normally out of engagement with said function control members but movable into engagement with them, said means being positioned by said carriage as the latter moves to different columnar positions so that said means is able to selectively engage said function control members, and operating connections between said movable means and said general operating means acting automatically at the beginning of a machine cycle to cause said movable means to be moved into engagement with said function control members by the power of said general operating means to thereby selectively condition said machine for predetermined functions for said cycle, said operating connections causing said movable means to be moved out of engagement with said function control members prior to movement of said carriage at the end of said cycle.

2. In a machine of the class described having a general operating means for giving it cycles of operation, a traveling paper carriage normally moved from one column to another as an incident to each machine cycle, and function control members selectively movable to condition said machine for predetermined functions; the combination of a frame movably mounted on said carriage, a plurality of index abutments on said frame adapted to selectively engage said function control members in different columnar positions of said carriage, means urging said frame to a position to maintain said abutments out of engagement with said control members, and operating connections between said movable frame and said general operating means acting automatically at the beginning of a machine cycle to cause said movable frame to be moved to move said abutments into engagement with said function control members by the power of said general operating means to thereby condition said machine for predetermined functions for said cycle, said operating connections causing said abutments to be moved out of engagement with said control members prior to movement of the carriage at the end of said cycle.

3. In a machine of the class described having a general operating means for giving it cycles of operation, a movable device normally moved from one position to another as an incident to each machine cycle, and function control members adapted to be actuated by said movable device to selectively condition said machine for predetermined functions for respective machine cycles; the combination of movable means mounted on said movable device so as to be normally out of engagement with said function control members but movable into engagement with them, said movable means being indexed by said movable device as the latter moves to its different positions as an incident to machine cycles, and operating connections between said movable means and said general operating means acting automatically at the beginning of a machine cycle to cause said movable means to be moved into engagement with said function control members by the power of said general operating means to thereby condition said machine for predetermined functions for said cycle, said operating connections causing said movable means to be moved out of engagement with said function control members prior to movement of said movable device at the end of said machine cycle.

RAYMOND G. BOWER.